United States Patent [19]

Hirashita et al.

[11] Patent Number: 5,025,897
[45] Date of Patent: Jun. 25, 1991

[54] DISK BRAKE

[75] Inventors: Hiroshi Hirashita; Seiya Odaka, both of Saitama, Japan

[73] Assignee: Akebono Brake Industry Co., Ltd., Tokyo, Japan

[21] Appl. No.: 378,101

[22] Filed: Jul. 11, 1989

[30] Foreign Application Priority Data

Jul. 18, 1988 [JP] Japan .................. 63-94683

[51] Int. Cl.⁵ ............................ F16D 55/224
[52] U.S. Cl. .................. 188/73.38; 188/73.1; 188/73.39; 188/250 B
[58] Field of Search ............ 188/73.38, 73.37, 73.39, 188/73.1, 250 B

[56] References Cited

U.S. PATENT DOCUMENTS

| 3,368,647 | 2/1968 | Laverdant . | |
|---|---|---|---|
| 4,171,037 | 10/1979 | Souma et al. | 188/73.5 |
| 4,607,728 | 8/1986 | Kobayashi | 188/73.38 |

FOREIGN PATENT DOCUMENTS

| 10836 | 2/1981 | Japan | 188/73.39 |
|---|---|---|---|
| 166642 | 7/1988 | Japan | 188/73.38 |
| 1408681 | 10/1975 | United Kingdom . | |
| 2013290 | 8/1979 | United Kingdom . | |
| 2114243 | 8/1983 | United Kingdom . | |
| 2132292 | 7/1984 | United Kingdom . | |
| 2147376 | 12/1986 | United Kingdom . | |
| 2196072 | 4/1988 | United Kingdom . | |

*Primary Examiner*—George E. A. Halvosa
*Attorney, Agent, or Firm*—Sughrue, Mion, Zinn, Macpeak & Seas

[57] ABSTRACT

A disk brake of a floating caliper type having a disk rotating with a vehicle wheel, a caliper having a hydraulic cylinder mechanism, a support member secured to a stationary portion of a vehicle and a pair of friction pads mounted on the support member. The friction pads supported by the support member through wedge contact and resiliently urged by spring portions of pad clip members so that the friction pads are kept in surface contact with the support member at the time of non-braking. A sufficient area for transmitting the braking forces applied by the friction pads are stably maintained at the time of start of the braking, and the rotation moment on the pads are reduced and the braking forces are dispersedly transmitted to the disk run-in and run-out sides of the support member during the braking.

7 Claims, 4 Drawing Sheets

DISK BRAKE

FIELD OF THE INVENTION

The present invention relates to a disk brake for motor vehicles, and more particularly to an improvement of a disk brake of a floating caliper type.

BACKGROUND OF THE INVENTION

A conventional disk brake of a floating caliper type has two friction pads disposed on opposite sides of a disk rotatable with a vehicle wheel and supported by a support member secured to the vehicle body for slide movement in an axial direction of the disk. The friction pads are frictionally engageable with the rotating disk by a hydraulic actuator to apply braking force to the disk.

Each of the friction pads has sliding projections extending from both sides thereof, and the support member is provided with guide grooves in which the sliding projections of the pad are fitted to allow the pad to move in the axial direction of the disk. The disk brake of that kind is known from U.S. Pat. No. 3,368,647.

When the braking force is applied to the disk of the conventional disk brake constructed as described above, the braking forces are mostly transmitted from the friction pads to the disk run-out side of the support member. For that reason, an undesirable clearance is surely made between the friction pad and the support member at the disk run-in side thereof, so that a vibration of the pad may occur. As a result, the conventional disk brake suffers from a problem that a noise or a chatter is caused. Further, if the clearance is large due to the dimensional accuracy of the components of the disk brake, a collision noise may be caused during the braking.

SUMMARY OF THE INVENTION

The present invention was made in order to solve the above-mentioned problems accompanying the conventional disk brake. Accordingly, it is an object of the present invention to provide a disk brake in which friction pads are kept in surface connection with anchors of a support member both at the time of braking and at the time of non-braking to prevent a clearance from being generated. It is another object of the invention to provide a disk brake capable of preventing the friction pads from floating up from the support member due to the moment of turning at the time of braking. It is still another object of the invention to provide a disk brake in which the number of the components of the disk brake and the constitution of the components are relatively small and very simple, respectively.

In a disk brake provided in accordance with the present invention, a disk, a pair of friction pads and a support member are provided. The disk is rotatable with a wheel of a vehicle. The friction pads are disposed on opposite sides of the disk and opposed to each other across the disk so that the pads are frictionally engageable with the disk by a caliper having a hydraulic cylinder mechanism. The support member is secured to a stationary portion of the vehicle and extends for straddling over the disk. The friction pads are guided in the axial direction of the disk by the support member so that the braking forces caused by the frictional engagement of the pads with the disk are received by the anchors of the support member.

The disk brake is characterized in that each of the friction pads has a nearly sectorial shape, and includes a pair of engaging surfaces located at both sides of the pad and sloping nearly in the radial directions of the disk, a pair of step portions located at both ends of the radially inner edge of the pad and facing each other, and a pair of shoulder portions located at both ends of the radially outer edge of the pad; the support member includes pairs of pushing anchors facing the engaging surfaces of the friction pads, pairs of pulling anchors facing the step portions of the pads, and pairs of float preventing anchors facing the shoulders of the pads; a pad clip member which is made of a single plate, is provided in such a manner that the pad clip member continuously covers at least the pulling anchors, pushing anchors and float preventing anchors of the support member at the disk run-in side thereof when the vehicle is moving forwardly.

The pad clip member is integrally provided with a spring portion interposed between the shoulder of the friction pad and the float preventing anchor of the support member so as to resiliently urge the pad toward the center of the rotation of the disk.

In the disk brake in accordance with the present invention thus constructed, the pairs of engaging surfaces of the e friction pads extending nearly in the radial directions of the disk and the pushing anchors of the support member facing the engaging surfaces are put in wedge engagement with each other so that the friction pads are kept in surface connection with the pushing anchors of the support member at the time of non-braking, because the friction pads are resiliently urged inside the support member toward the center of rotation of the disk by a spring member of the pad clip member.

As a result, the friction pads are stably supported at the time of braking as well. That is, at the time of braking, the friction pads are pulled by the disk due to the frictional engagement of the pads with the disk so that the pads are moved to be supported in contact with the pulling anchors and pushing anchors of the support member to apply the braking forces to the disk. Although the rotation moment acts to the friction pads to cause them to float up at the disk run-in side at the time of braking, the pads are prevented from floating up and coming into unequal contact with the anchors of the support member, because the pads are resiliently urged at the shoulder thereof by the spring portions of the pad clip member.

For that reason, the friction pads are kept in surface connection with the support member so that the braking forces are surely transmitted to the support member through the pads, and the postures of the pads are stabilized to suppress the vibration thereof.

Since the pad clip members, which continuously covers the anchors supporting the friction pads are integrally provided with the spring portions for pushing the shoulders of the pads, resilient forces are constantly applied to the shoulders of the friction pads and the float preventing anchor of the support member by the spring member depending on the behavior of the pads, so that a clearance, which would cause a noise or a chatter, is prevented from occurring between the support member and the friction pads. The noise or the chatter can thus be avoided.

DESCRIPTION OF THE PREFERRED EMBODIMENTS

A preferred embodiment of the present invention is hereafter described in detail with reference to accompanying drawings.

Figure 1:
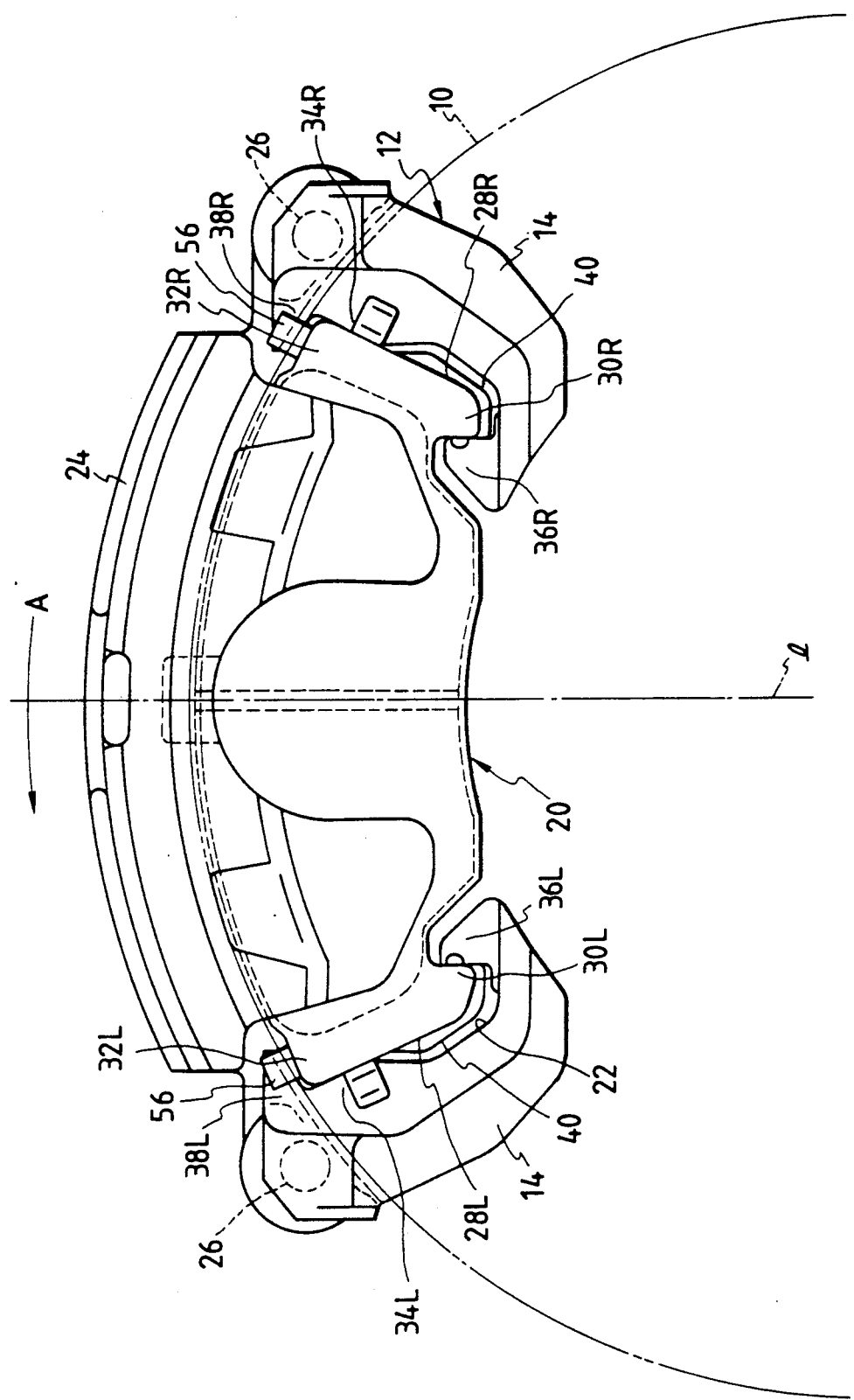
FIG. 1 is a front view of a disk brake which is an embodiment of the present invention.
Figure 2:
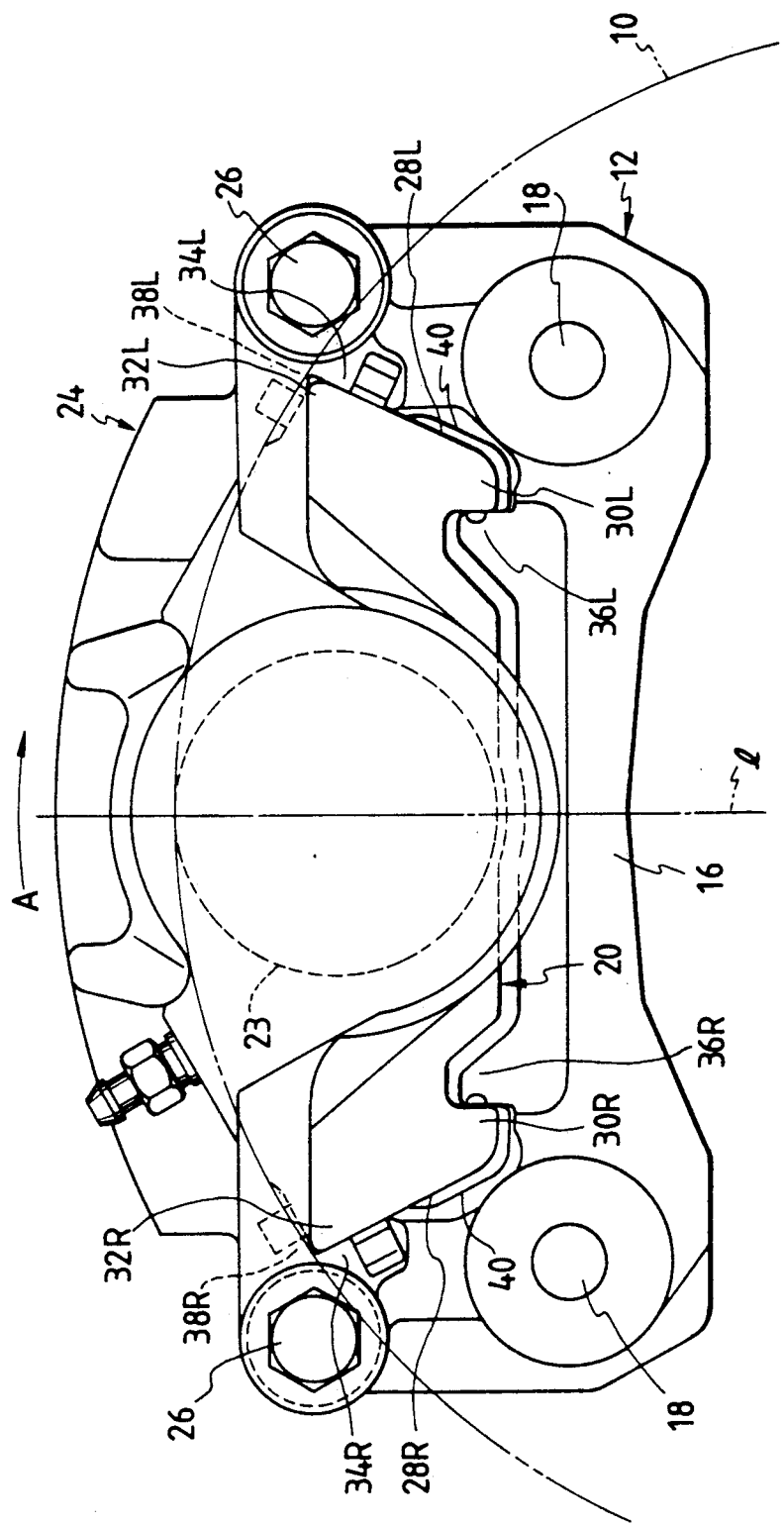
FIG. 2 is a rear view of the disk brake.

FIG. 1 is a front view of a disk brake which is the embodiment of the invention and FIG. 2 is a rear view thereof. The disk brake has a support member 12 which is an inverted U-shaped in cross section so that the support member extends straddling over a disk 10 which is rotatable with a wheel of a vehicle. The support member 12 is provided with a pair of outer portions 14 located at the outer side of the disk 10, and an inner bridge 16 located at the inner side of the disk and secured to the vehicle body.

The inner bridge 16 has tapped holes 18 at both ends thereof. Fixing bolts are engaged in the tapped holes 18 and tightened to secure the support member 12 to a stationary portion of the vehicle body. Openings 22, in which the friction pads 20 of the disk brake are supported to be movable in the axial direction of the disk 10, are provided along the outer portions 14 and inner bridge 16 of the support member 12, and have nearly sectorial forms corresponding to the forms of the friction pads. The caliper 24 of the disk brake is provided with a hydraulic cylinder mechanism 23 at the inner side of the disk 10 to frictionally engage the pads 20 with the disk, and is floatingly mounted to the support member 12.

Guide pins 26 provided at both sides of the hydraulic cylinder mechanism 23 are slidably fitted in the guide openings of the support member 12 so that a pair of sliding engagement means for guiding the caliper 24 in the axial direction of the disk 10 are constituted. When the hydraulic cylinder mechanism 23 is put in action, the inner friction pad 20 is pushed into contact with the inner side of the disk 10. At that time, the caliper 24 moves in the axial direction of the disk 10 by the pair of sliding engagement means due to the reaction of the pushing force added to the inner friction pad 20, so that the outer friction pad 20 is pushed into contact with the outer side of the disk. As a result, braking forces are applied to the disk 10.

The braking force transmission mechanism of the disk brake will now be described with regard to the relationship between the inner friction pad 20 and the inner bridge 16 of the support member 12 shown in FIG. 2.

The friction pad 20 is shaped nearly as a sector so as to be symmetric rightward and leftward. The right and left sides of the pad 20 are provided with engaging surfaces 28R and 28L sloping nearly in the radial directions of the disk 10. The engaging surfaces 28R and 28L of the pad 20 come into contact with the anchors of the support member 12 at the disk run-out side thereof so that the braking force is transmitted to the support member through the pad.

The friction pad 20 has a pair of step portions 30R and 30L which are located at both ends of the radially inner edge of the pad and facing each other so that the braking force is transmitted to the support member 12 at the disk run-in side thereof. The pad 20 has a pair of shoulders 32R and 32L which are located at both ends of the radially outer edge of the pad and extend nearly perpendicularly to the engaging surfaces 28R and 28L of the pad so that when the pad receives such rotation moment as to turn about the center of the rotation of the disk 10 to cause it to float up, the shoulder is engaged with the overhang portion of the support member 12 to support the pad.

The support member 12, which receives the braking force from the friction pad 20, has a plurality of anchors, some of which are pushing anchors 34R and 34L facing the engaging surfaces 28R and 28L of the pad so as to come into contact with the engaging surfaces. The pushing anchors 34R and 34L extend nearly in the radial directions of the disk 10, along the engaging surfaces 28R and 28L of the pad 20, so that the support member 12 is in wedge connection with the pad located inside the member. Others of the anchors of the support member 12 are pulling anchors 36R and 36L, which are engageable with the engaging anchors 30R and 30L of the pad 20. The pulling anchors 36R and 36L extend up from the bottom of the opening 22 and face the engaging anchors 30R and 30L so as to receive the braking force from the friction pad 20 at the disk run-in side thereof. Since the braking force is transmitted through the engaging anchor 30R or 30L and the pulling anchor 36R or 36L, the friction pad 20 is pulled in the direction of the rotation of the disk 10. The mutually engaging surfaces of the anchors 30R, 30L, 36R and 36L are preset in parallel with a plane l extending on the axis of the disk 10 and that of the piston of the hydraulic cylinder mechanism 23. The support member 12 is provided with the overhang portions extending toward the shoulders 32R and 32L of the friction pad 20. The overhang portions have float preventing anchors 38R and 38L facing the shoulders 32R and 32L so as to prevent the friction pad 20 from moving outward in the radial direction of the disk 10.

The relationship between the outer friction pad 20 and the outer portions 14 of the support member 12 is similar to that between the inner friction pad 20 and the inner bridge 16 of the support member, and shown in FIG. 1 in which the direction A of the rotation of the disk 10 is indicated reversely to that shown in FIG. 2. Since no equivalent of the inner bridge 16 facing the radially inner edge of the inner friction pad 20 is provided between the outer portions 14 of the support member 12, the pulling anchors 36R and 36L of the outer portions are separated from each other.

Figure 3:
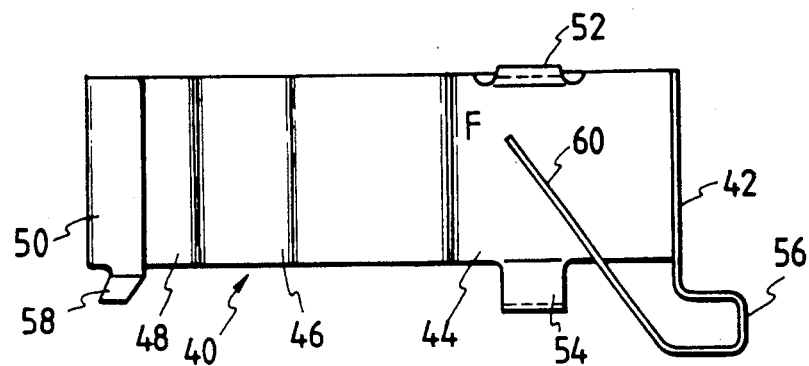
FIG. 3 is a front view of the pad clip member of the disk brake.
Figure 4:
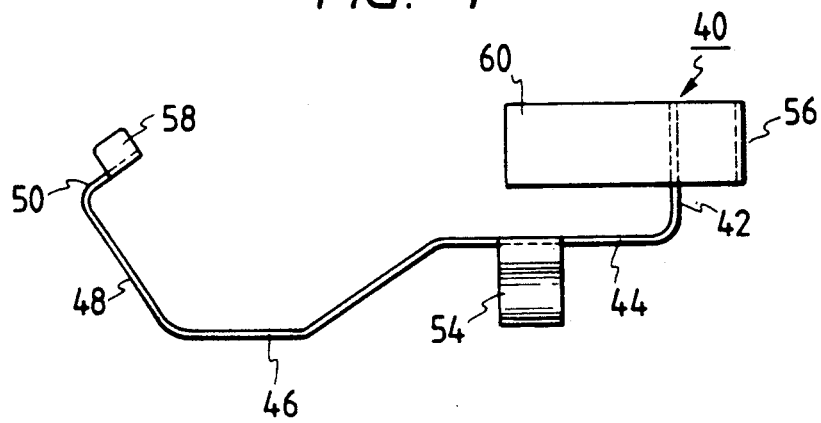
FIG. 4 is a side view of the pad clip member.
Figure 5:
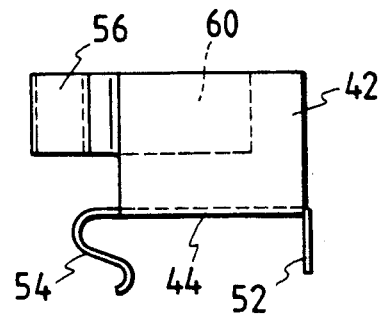
FIG. 5 is a plan view of the pad clip member.

Spring portions for pushing the friction pads 20 into the openings 22 inside the support member 12 are provided between the shoulders 32R and 32L of the pads and the float preventing anchors 38R and 38L of the support member, which face the shoulders. The spring portions are included in pad clip members 40, each of which is shown in FIGS. 3, 4 and 5 and made of a single plate so that the pad clip member continuously covers the float preventing anchor 38R or 38L, the pushing anchor 34R or 34L and the pulling anchor 36R or 36L. For that purpose, each pad clip member 40 is bent in such a manner that it includes a first plate portion 42 located in contact with the float preventing anchor 38R or 38L, and a second plate portion 44 located in contact with the pushing anchor 34R or 34L. The first and the second plate portions 42 and 44 extend perpendicularly to each other. A coupling plate portion 46 extends from the lower end of the second plate portion 44 extending in the radial direction of the disk 10. A horizontal portion 48 is bent from the coupling plate portion 46. A third plate portion 50 vertically extends up from the horizontal portion 48 and is located in contact with the pulling anchor 36R or 36L. The coupling plate portion 46 is bent outward so that it does not come into contact with the support member 12 and the friction pad 20, as shown in FIGS. 1 and 2. A bent portion 52 and a support portion 54, which is bent to act as a spring to hold the pad clip member 40 on the support member 12 by pinching, are provided on the second plate portion 44 at the side edges thereof to support the pad clip member on the support member. A bent portion 56 for decreasing the spring constant of the spring portion 60 is provided on the first plate portion 42 at one side edge thereof. A bent guide portion 58 for making it easy to fit the friction pad 20 inside the support member 12 is provided on the third plate portion 50 at one side edge thereof.

The spring portion 60 for resiliently urging the friction pad 20 in the opening 22 inside the support member 12 toward the center of the rotation of the disk 10 is integrally provided in the pad clip member 40. In other words, the pad clip member 40 has not only the U-bent portion 50 at the side edge of the first plate portion 42, but also the spring portion 60 extending from the tip of the U-bent portion below the first plate portion 42 so that the spring portion and the first plate portion extend relative to each other in the form of V, as shown in FIG. 3. As a result, the spring portion 60 acts as a spring so that the friction pad 20 in contact with the spring portion is resiliently urged in such a direction as to move away from the first plate portion 42. The pad clip member 40 is attached to the support member 12 so that the open side of the form of V constituted by the spring portion 60 and the first plate portion 42 faces the disk 10.

The operation of the disk brake will be described below.

Figure 6A:
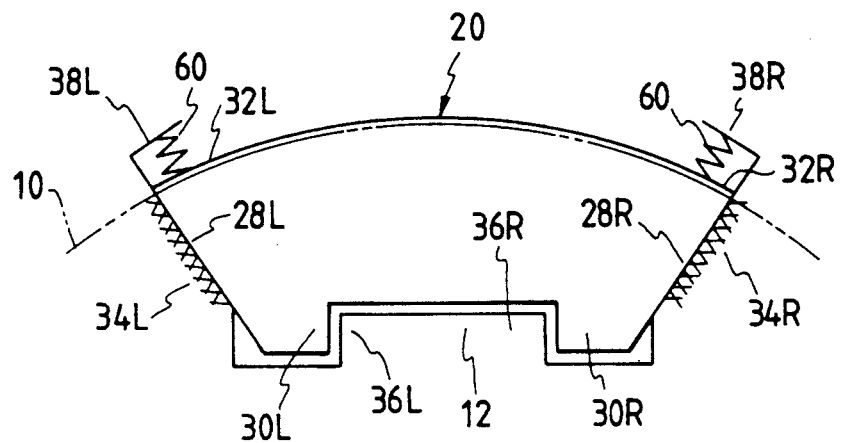
FIGS. 6A and 6B are views for describing the behavior of the friction pad of the disk brake at the time of non-braking and at the time of braking, respectively.
Figure 6B:
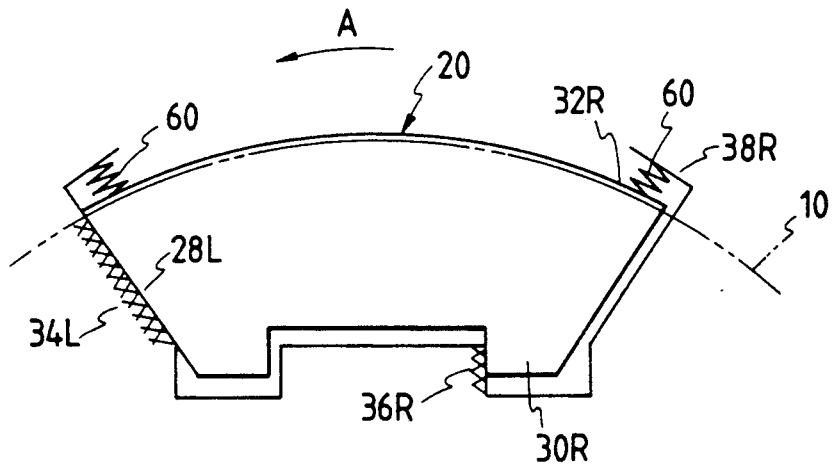

When the wheel of the vehicle is not braked by the disk brake, the friction pads 20 are out of contact with the disk 10 and the engaging surfaces 28R and 28L of the pads are on the interposed pad clip member 40 on the pushing anchors 34R and 34L of the support member 12, as shown in FIG. 6A. At that time, the spring portions 60 of the pad clip members 40 act to push the shoulders 32R and 32L of the friction pads 20, at the float preventing anchors 38R and 38L, toward the center of the disk 10 to exert wedge effects upon the pads to keep them in surface contact with the support member 12. For that reason, even if the dimensional accuracy of the support member 12 and the friction pads 20 is rough, the pads are surely kept in surface contact with the support member. In other words, if the friction pads 20 are relatively large compared with the support member 12, the locations of the contact of the engaging surfaces 28R and 28L of the pads and the pushing anchors 34R and 34L of the support member are shifted outward in the radial direction of the disk 10 so that the pads are surely kept in surface contact with the support member.

If the friction pads 20 are relatively small compared with the support member 12, the locations of the contact of the engaging surfaces 28R and 28L of the pads and the pushing anchors 34R and 34L of the support member are shifted inward in the radial direction of the disk 10 so that the pads are surely kept in surface contact with the support member. For these reasons, the engaging surfaces 28R and 28L and the pushing anchors 34R and 34L are always kept in surface contact at the time of braking of the wheel as well as at the time of non-braking thereof so that the pads 20 are stably supported.

When the wheel is braked by the disk brake with the disk 10 rotating in the direction A during the forward movement of the vehicle, the braking forces are received from the friction pads 20 by the pulling anchors 36R at the disk run-in side thereof and by the pushing anchors 34L at the disk run-out side thereof so that the braking forces are dispersedly transmitted to the disk run-in and run-out sides of the support member to make it less likely for the braking forces to deform the support member. At that time, the reaction force acting to the friction pad 20 constitutes such moment as to turn the pad about the center of the disk 10, but the spring portion 60 of the pad clip member 40 interposed between the shoulder 32R and the float preventing anchor 38R holds the pad resiliently to prevent it from floating up. For that reason, the pad 20 is kept in surface contact with the pulling anchor 36R and the pushing anchor 34L so that the braking force is prevented from being transmitted from the pad to the support member 12 as the pad is in unequal contact with the support member. Since the moment of turning on the friction pad 20 is reduced by the spring portion 60 of the pad clip member 40 at the time of braking of the wheel so that the pad slides on the slope of the pushing anchor 34l, and is surely kept in surface contact with the pulling anchor 36R, the braking force is well transmitted from the pad to the support member 12. Such an effect is produced at the time of braking of the wheel during the backward movement of the vehicle as well.

Since the spring portion 60 integral with the pad clip member 40 is resiliently interposed between the friction pad 20 and the support member. 12, the pad does not float up but is always well supported by the support member 12. However, as shown in the Figures, especially FIG. 3, any excessive deformation of spring portion 60 with respect to its predetermined shape will cause it to contact first plate portion 42. For that reason, a noise or the like is prevented and a vibration such as a chatter is effectively suppressed.

According to the present invention, as described above, friction pads are supported by a support member through wedge contact and resiliently urged by the spring portions of pad clip members so that the friction pads are kept in surface contact with the support member at the time of non-braking. For that reason, a sufficient area for transmitting the braking forces applied by the friction pads is stably maintained at the time of start of the braking, and the rotation moment on the pads is reduced and the braking forces are dispersedly transmitted to the disk run-in and run-out sides of the support member during the braking so as to prevent a noise and a vibration such as a chatter.

What is claimed is:

1. A disk brake of a floating caliper type for a motor vehicle, comprising:
    a disk rotating with a wheel of the vehicle;
    a caliper having a hydraulic cylinder mechanism;
    a pair of friction pads frictionally engageable with said disk by an actuation of said hydraulic cylinder mechanism, each of said friction pads is of a sectorial shape and includes a right side and a left side and a radial outer side and a radial inner side, each of said friction pads is provided with an engaging surface positioned at said right side and said left side, respectively, thereof and inclined substantially along a radial direction of said disk, a pair of step portions facing each other positioned at said radial inner side of said friction pads, and a pair of shoulder portions positioned at said radial outer side of said friction pads;

a support member for guiding said pair of friction pads to move in an axial direction of said disk, said support member straddling over said disk, said support member being secured to a stationary portion of the vehicle, said support member being provided with anchors receiving a braking force generated by frictional engagement between said friction pads and said rotating disk, said anchors comprising a pair of pushing anchors facing said engaging surfaces of said friction pads, a pair of pulling anchors facing said step portions of said friction pads, and a pair of float preventing anchors facing said shoulder portions of said friction pads; and a pad clip member for continuously covering said pulling anchor, said pushing anchor and said float preventing anchor of said support member at at least the disk run-in side thereof when said vehicle is moving forwardly, said pad clip member being formed of a single plate, said pad clip member being provided with a spring portion for elastically urging a corresponding one of said friction pads toward the center of rotation of said disk, said spring portion being positioned between said shoulder portion of said corresponding one of said friction pads and said float preventing anchor of said support member, said spring portion contacting a portion of said pad clip member covering said float preventing anchor when said spring portion deforms excessively with respect to a predetermined shape.

2. The disk brake according to claim 1, wherein said pad clip member comprises:
   a first plate abutting against said float preventing anchor of said support member;
   a second plate abutting against said pushing anchor of said support member, said second plate being bent perpendicularly to said first plate;
   a connecting portion extending from said second plate; and
   a third plate abutting against said pulling anchor of said support member, said third plate being formed by bending an end of said connecting portion,
   wherein said spring portion of said pad clip member is formed by bending continuously from said first plate to said third plate.

3. The disk brake according to claim 2, wherein said third plate of said pad clip member comprises a guide piece for readily mounting said friction pad, said guide piece is formed by bending a side edge of said third plate.

4. The disk brake according to claim 2, wherein said second plate comprises a bending piece at one side edge of said second plate, and a holding piece acting as a spring at the other side edge thereof, whereby said pad clip member is mounted on said support member.

5. The disk brake according to claim 2, wherein said first plate of said pad clip member is provided with a U-shaped portion at the side thereof, said spring portion is formed by bending an end of said U-shaped portion, said spring portion extends under said first plate so that said spring portion and said first plate extend relative to each other in the form of V.

6. The disk brake according to claim 5, wherein said form of V of said first plate and said spring portion opens towards said disk.

7. The disk brake according to claim 5, a spring constant of said spring portion of said pad clip member is determined by said U-shaped portion.

* * * * *